United States Patent
McAvoy et al.

(10) Patent No.: US 7,343,348 B2
(45) Date of Patent: Mar. 11, 2008

(54) SYSTEM FOR PERFORMING REAL-ESTATE TRANSACTIONS OVER A COMPUTER NETWORK USING PARTICIPANT TEMPLATES

(75) Inventors: Charles McAvoy, Granite Bay, CA (US); Erik Novikoff, Sacramento, CA (US); Kelly S. Pantis, Carmichael, CA (US); Elizabeth Hitchcock, Sacramento, CA (US)

(73) Assignee: First American Residential Group, Inc., Santa Ana, CA (US)

( * ) Notice: Subject to any disclaimer, the term of this patent is extended or adjusted under 35 U.S.C. 154(b) by 237 days.

(21) Appl. No.: 09/861,282

(22) Filed: May 18, 2001

(65) Prior Publication Data

US 2002/0095385 A1  Jul. 18, 2002

(51) Int. Cl.
*H04K 1/00* (2006.01)
*H04L 9/00* (2006.01)

(52) U.S. Cl. .................. 705/54; 705/1; 705/27; 705/35; 705/51; 705/54; 707/10; 709/224; 715/507

(58) Field of Classification Search .............. 705/51, 705/1, 64, 27, 35, 54; 707/10; 709/224; 715/507
See application file for complete search history.

(56) References Cited

U.S. PATENT DOCUMENTS

| | | | |
|---|---|---|---|
| 5,892,900 A * | 4/1999 | Ginter et al. ............. 713/200 |
| 5,920,861 A * | 7/1999 | Hall et al. .................. 707/9 |
| 5,933,816 A * | 8/1999 | Zeanah et al. ............. 705/35 |
| 6,412,073 B1 * | 6/2002 | Rangan ...................... 726/5 |
| 6,594,633 B1 * | 7/2003 | Broerman .................. 705/1 |
| 6,623,529 B1 * | 9/2003 | Lakritz ..................... 715/536 |
| 6,633,875 B2 * | 10/2003 | Brady ..................... 705/36 R |
| 6,658,568 B1 * | 12/2003 | Ginter et al. ............. 713/193 |
| 6,751,620 B2 * | 6/2004 | Orbanes et al. ............ 707/10 |
| 2005/0114353 A1 * | 5/2005 | Malik et al. .............. 707/10 |

* cited by examiner

*Primary Examiner*—Bradley Bayat
(74) *Attorney, Agent, or Firm*—R. Blake Johnston; DLA Piper US LLP

(57) ABSTRACT

A system for facilitating electronic transactions among participants to a transaction is afforded that comprises a server having a software application stored thereon, one or more databases associated with the server for storing transactional data and documents relating to the transactions, and one or ignore client computer systems connected with the server for remotely accessing the transactional data and documents pertaining to the transactions and for performing particular tasks relating to the transactions. The software application is logically segmented into particular sites for controlling the functionality of the electronic transactions, and each site has a set of associated templates for managing information about the transactions. The templates control the business rules and functionality of the transactions. Preferably, the templates are grouped according to particular categories, such as transaction types, data forms, transaction data, participants rules, services rules, and documents. Each template includes one or more data fields pertaining to parametric data about an aspect of the transaction and wherein each field is associated with a permissions parameter indicating a particular participant's ability to interact with the data maintained in the field. The permissions parameter indicates a participant's ability to view, modify, or delete the data maintained in the field.

10 Claims, 4 Drawing Sheets

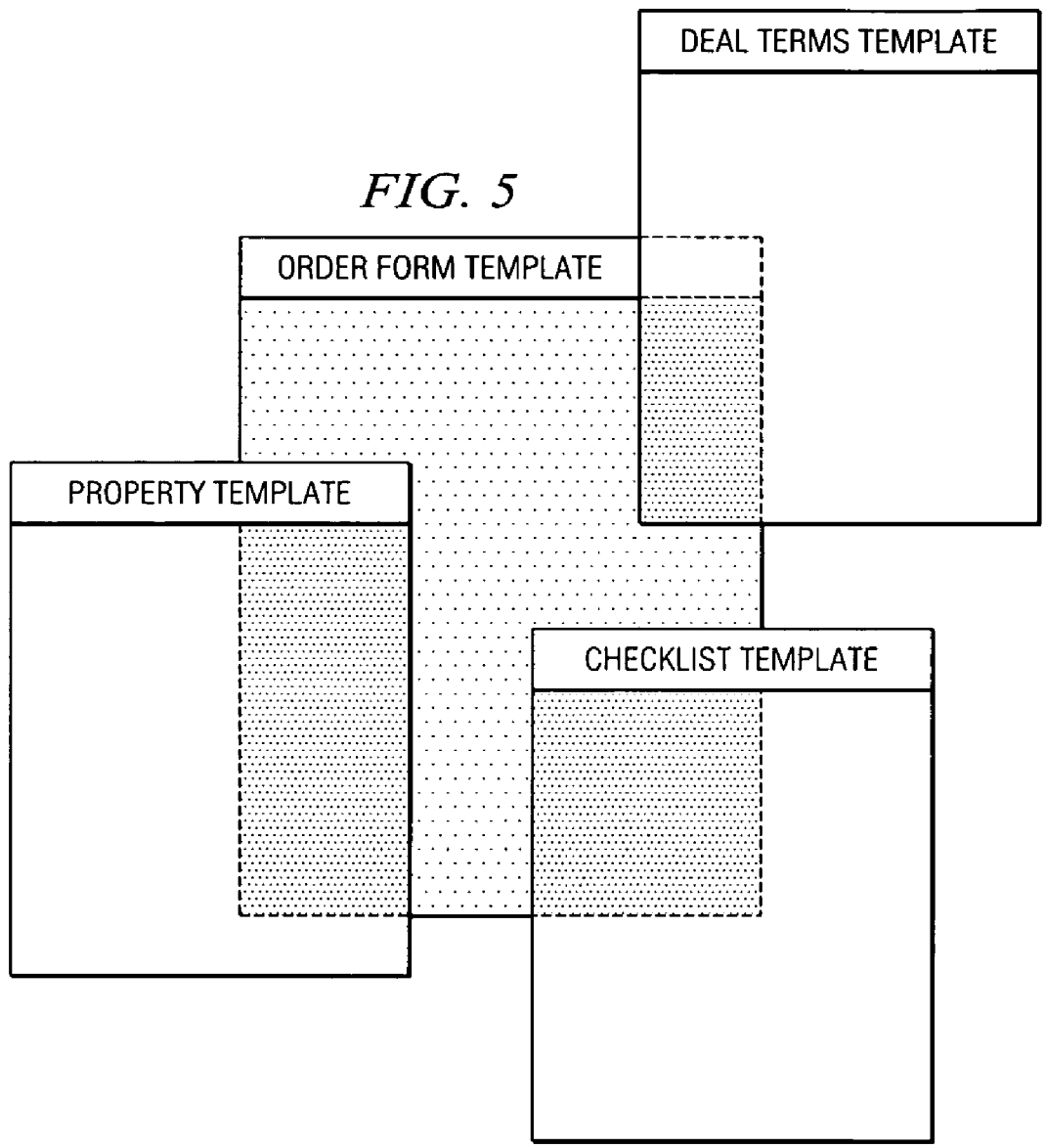

SYSTEM FOR PERFORMING REAL-ESTATE TRANSACTIONS OVER A COMPUTER NETWORK USING PARTICIPANT TEMPLATES

The invention generally relates to methods and apparatus configured to perform online business transactions and, more particularly, to a method and apparatus configured to perform a real estate transaction over a computer network by defining the roles of participants using templates.

Real estate transactions typically involve a great deal of paperwork exchanging hands among the many people involved in the transactions. The documents do not conform to any particular format. These documents are often superceded by subsequent documents as the transaction progresses to the ultimate sale. As a result, a lot of paperwork ends up being generated during the transaction that has no further purpose after the transaction is completed. It would be useful be able to review these important documents without the need to constantly reproduce them, wasting paper and other valuable resources, as well as wasting time in shipping the documents to the appropriate people for their review.

These transactions also involve a large number of people communicating via a telephone, facsimile and other means. The buyer and seller agents, the buyer and seller, title companies, insurance companies, mortgage companies and other participants in the transaction must communicate at every level of the transaction from the initial offer through and including the final sale. Currently, these transactions drag out as a result of simply waiting for each participant to complete their individual tasks. As a result, most participants in the process do not know the status of all of the various components that need to be executed at any given time. Sometimes this information is known to only one person, making the information unavailable if they are not available. The conventional methods of communication and coordination in a real estate transaction may include phones, pagers and the occasional fax. It would be useful to have a system that contains all of the data available to all who can see it when they want to see it. It would also be useful to have a source containing the persistent data that is critical for the transaction.

Therefore, there exists a need for a method and apparatus for processing real estate transactions that does not involve a lot of paperwork. As will be understood by reading below, the invention accomplishes this in an elegant manner.

SUMMARY OF THE INVENTION

The invention includes a method and apparatus for processing an entire real estate transaction. The invention may include a software application configured to share information related to a real estate transaction among the participants of a transaction according to their role in the transaction. Templates may be established to define the roles of the participants. Once given access to the application, a user can access information related to the transaction, but is limited to accessing information associated to their particular role in the transaction as defined by the templates. For example, an appraiser can access information related to valuing the property being bought and sold in the transaction, but may not be able to access a buyer's credit information. There may be a principal manager of the transaction to oversee and govern any user's access privileges. Once roles are established, the application may be used to initiate a transaction, begin a file for storing transaction documents, view the status of the file, update a file, exchange documents and perform many other activities according to a user's authority defined by the user's role.

In one embodiment, the invention may be configured to post documents in electronic format that can be reviewed online over a computer network. The invention also may include the ability to receive data from a user, such as name, address, etc., and perpetuate the information on multiple order forms at once. This greatly streamlines the process and reduces the risk of errors. The invention also allows for the ordering of services typically associated with a real estate transaction in an automated fashion, sharing data, and the electronic posting of documents for review and approval.

The features and functions of the invention may be implemented by encoding computer readable software in the form of Java, C++, or other computer readable software formats that can configure a computer to perform the features and functions.

The invention may be designed and implemented on a computer and may be connected to a network for communication with other computers to practice the invention. A system configured to operate according to the invention may include a plurality of personal computers connected to the Internet via individual modems or other communications means such as wireless communications. The invention may involve a number of functions to be performed by a computer processor, such as a microprocessor. The microprocessor may be a specialized or dedicated microprocessor that is configured to perform particular tasks by executing machine readable software code that defines particular tasks. The microprocessor may also be configured to operate and communicate with other devices such as direct memory access modules, memory storage devices, internet related hardware, and other devices that relate to the transmission of data in accordance with the invention. The software code may be configured using software formats such as Java, C++, XML and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the detailed description as well as its subparts included therein.

In an aspect of the invention, a system for facilitating electronic transactions among participants to a transaction is afforded that comprises a server having a software application stored thereon, one or more databases associated with the server for storing transactional data and documents relating to the transactions, and one or more client computer systems connected with the server for remotely accessing the transactional data and documents pertaining to the transactions and for performing particular tasks relating to the transactions. The software application is logically segmented into particular sites for controlling the functionality of the electronic transactions, and each site has a set of associated templates for managing information about the transactions.

The templates control the business rules and functionality of the transactions. Preferably, the templates are grouped according to particular categories, such as transaction types, data forms, transaction data, participants rules, services rules, and documents. The transaction types templates determine the data forms templates that are available for a particular transaction. The data forms templates define the core transaction data pertaining to a particular transaction and specify field-level access rights to the data in accordance with a user's role in the transaction. The participants rules templates determine what participants can be a party to a particular transaction. The document templates determine which documents are needed for a particular transaction, and what access various participants to the transaction have to those documents.

Each template includes one or more data fields pertaining to parametric data about an aspect of the transaction and wherein each field is associated with a permissions parameter indicating a particular participant's ability to interact with the data maintained in the field. The permissions parameter indicates a participant's ability to view, modify, or delete the data maintained in the field.

In another aspect of the invention, a system for facilitating electronic transactions between participants comprises one or more client computer systems connected to a server having a software application stored thereon. The software application is logically segmented into particular sites for controlling the functionality of the electronic transactions. Each site has a set of associated templates for managing information about the transactions. The software module includes a transaction module for processing the electronic transactions and a document storage module for receiving and storing transactional data and documents relating to the transaction. Further, client computer systems include a software application for interacting with the transaction module to remotely access the transactional data and documents pertaining to the transaction and for performing particular tasks relating to the transaction.

BRIEF DESCRIPTION OF THE DRAWINGS

FIG. 5 is a diagram illustrating how a file is populated with data fields from multiple template sources.

DETAILED DESCRIPTION OF THE PREFERRED EMBODIMENT

The present invention provides a software application configured to share information related to a real-estate transaction among the participants of a transaction according to their role in the transaction. Once roles are established, the software application may be used to initiate a transaction, begin a file for storing transaction documents, view the status of the file, update a file, exchange documents and perform many other activities according to a user's authority defined by the user's role.

Thus, the software application allows users to post documents in electronic format that can be reviewed online over a computer network. The application also may include the ability to receive data from a user, such as name, address, etc, and perpetuate the information on multiple order forms at once. This greatly streamlines the process and reduces the risk of errors. The application also allows for the ordering of services typically associated with a real-estate transaction in an automated fashion, allows the sharing of data among participants, and allows for the electronic posting of documents for individual review and approval.

Figure 1:
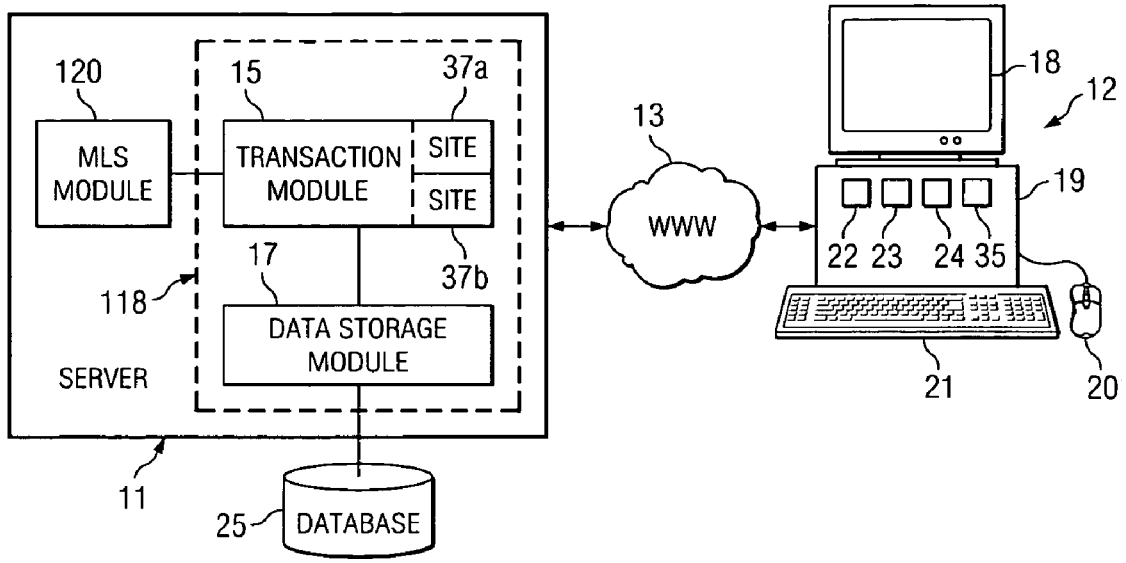
FIG. 1 shows a schematic diagram of an electronic real-estate transaction network with which the invention can be utilized.

Using the application, electronic transactions among participants to a transaction can be facilitated. Referring to FIG. 1, software application 118 includes a transaction module 15 for managing and processing the electronic transactions, and a document storage module 17 for receiving and storing transactional data and documents relating to the transaction. A number of databases (one shown at 25) may be associated with a server 11 hosting the application for storing the transactional data and documents, and client computer systems 12 may connect with the server 11 for remotely accessing the transactional data and documents pertaining to the transaction and for performing particular tasks relating to the transaction.

The transaction module 15 comprises a business object layer for requesting transactional data and documents from the database and implementing business logic components associated with the transaction data and documents. The database storage module 17 comprises a database object layer for receiving the request from the business object layer and in response thereto retrieving the appropriate transactional data and documents from the database and transmitting that transactional data and documents to the business object layer for processing.

The server 11 may interpret Active Server Pages and invoke particular business objects to facilitate managing the electronic transaction between the participants. The software application 118 is configured to share information related to each transaction among a plurality of participants to the transaction in accordance with each participant's role in the transaction. The transaction module 15 enables a participant to the transaction to post documents in electronic format for review by other participants to the transaction, and enables a participant to order services associated with a real estate transaction.

The transaction module may interface with an MLS module 120 to enable a network based Multiple Listing Service capability that can be used by the participants to the transaction. The MLS module 120 allows for any of custom searching of MLS information, reviewing multiple property flyer format, reviewing custom drag-and-drop flyers, maintaining an online address book, maintaining an online calendar, performing various real-estate related calculations, and reviewing statistical reports. The MLS module 120 integrates with a legacy based MLS system (not shown) to enable the import of the legacy based MLS system data into the database such that the legacy based MLS system data is available to the electronic transaction system.

In FIG. 1, the system 10 may include a server 11 connected with one or more clients 12 (one shown) across a wide area network (WAN) 13, such as the Internet, or more particularly, the World Wide Web. The Internet permits the server 11, when accessed by an individual client 12, to display a web page on the client's computer which permits the client 12 to interact with the server 11.

The client computer system 12 may include a display device 18, a chassis 19, and one or more user input devices, such as a mouse 20 and a keyboard 21. The chassis 19 may house a permanent storage system 22, such as a hard disk drive, optical disk drive, tape drive, or the like, which may store one or more software applications such as a web browser application. The client computer system 12 may have a memory 23 resident therein and the software application from the disk may be transferred to the memory 23 to be executed by a CPU 24. A browser application 35 of client 12 may be configured to connect the client 12 to the server 11 over the WAN 13 and receive graphical information (web pages) that may be displayed on the display device 18 to the user. The browser application 35 may also permit the client 12 to interact with the server 11, such as for creating or editing electronic real-estate transaction documents in a one or more database(s) 25 (one shown) that may be associated with the server 11.

The database(s) 25 may include a large number of records, which may be accessed by the server 11. For example, the database(s) 25 may include records pertaining to real estate documents, document information, and participant information. Software applications 118, 120, as configured to perform particular functions, may be stored on the server 11 and may be executed by the server 11 to enable electronic real estate transactions.

Having described the general context of a system 10 for facilitating electronic real estate transactions, the following discussion illustrates the utility of a template technology that can be utilized with the system 10 in accordance with the invention. The software application may be logically segmented into particular "sites" (e.g. 37a, 37b) (cobrand sites) for controlling the functionality of a transaction. Preferably, each cobrand site 37a, b can have its own unique set of templates for managing information about the transaction, and controlling aspects of the transaction. Templates control the business rules and functionality of the transaction. Once a user logs on to a particular cobrand site 37a or b, the user works within the business rules and functionality defined for that site.

In defining a new transaction, for example, a user selects a particular template for the transaction. Templates are typically filtered by geographic region, but may also be organized in an arbitrary manner. To retrieve a list of templates, the system preferably utilizes a cobrand identifier (that is obtained implicitly based on the user's logon), and the user's selection of the county where property is located. The combination of these fields determines which templates the user may choose from. Once this determination is made, the user may individually choose templates that relate to the various components of a transaction. These templates can also be selected implicitly based on the cobrand identifier.

Figure 2:
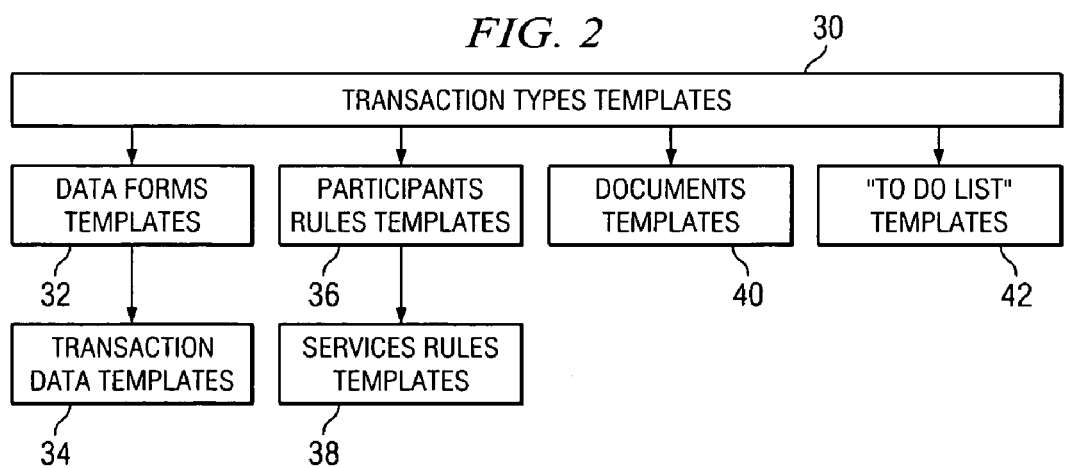
FIG. 2 is a block diagram showing various template categories that are available to the user.

FIG. 2 is a block diagram showing various template categories that are available to the user. Template categories may include transaction types templates 30, data form templates 32, transaction data templates 34, participants rules templates 36, services rules templates 38 and documents templates 40. Other template categories may be provided and the above are merely exemplary. Transaction types templates 30 determine the data form templates 32 that are available to the user. Transaction types can be selected implicitly based on the cobrand identifier. Data form templates 32 determine what data forms will be utilized during the transaction. Data forms define the core transaction data that the system utilizes during the course of the transaction. The data form templates 32 also specify field level access rights on the data by participant. Data form templates 32 are simply collections of data fields that are grouped together. They are used to control the data fields that are in a file and how these data fields are processed by the system. Data form templates 32 thus serve several roles in the system. Among others, they specify what data values will be used for a particular portion of the file data, allow default access to individual data fields by the participant's role, identify required attributes for a particular data field, permit default editing that would be performed on the data field, permit information to be rapidly sent to a service provider when orders are placed using the system, and dictate how the field data will be displayed and organized.

Exemplary transaction data templates 34 may include property information templates, building information templates, purchase terms templates, and closing and title templates. Others may also be provided. Participant and service rules templates 36, 38, determine what participants can be added to the transaction by whom, and what services can be ordered, viewed, and modified by which participants. Exemplary participants rules templates 36 may include buyer templates, seller templates, buyer's agent templates, and seller's agent templates. Others may also be provided. Exemplary services rules templates 38 may include appraisal templates, escrow templates, title templates, and pest inspection templates. Others may also be provided. Document templates 40 determine what documents are required as part of the transaction, and what access the various participants have to the documents. Exemplary document templates 40 may include pre-qualifier letter templates, title report templates, and pest inspection report templates. Others may also be provided.

Upon selecting from any of the above (or other) templates, a user may choose a "To Do List" template 42 from a filtered list of those available, and interact with the template by entering a contract open date and a target close date in appropriate fields in the template. Other "To Do Item" due dates may preferably be auto calculated based on pre-defined rules in accordance with the entered parametric information. Exemplary "To Do Items" may include "Open Escrow," "Order Termite Inspection," "Order Zone Disclosure," "Order Appraisal," and "Order Title." The user may also delete any items from the "To Do List" template 42 that do not apply to the particular transaction. Preferably, "To Do Items" are "owned" by a participant, are the responsibility of one or more participants, and are intelligently linked to the tasks that need to be performed in the system, using techniques that are well known, such as ordering services, posting documents, adding participants, scheduling walk-throughs, etc.

Figure 3A:
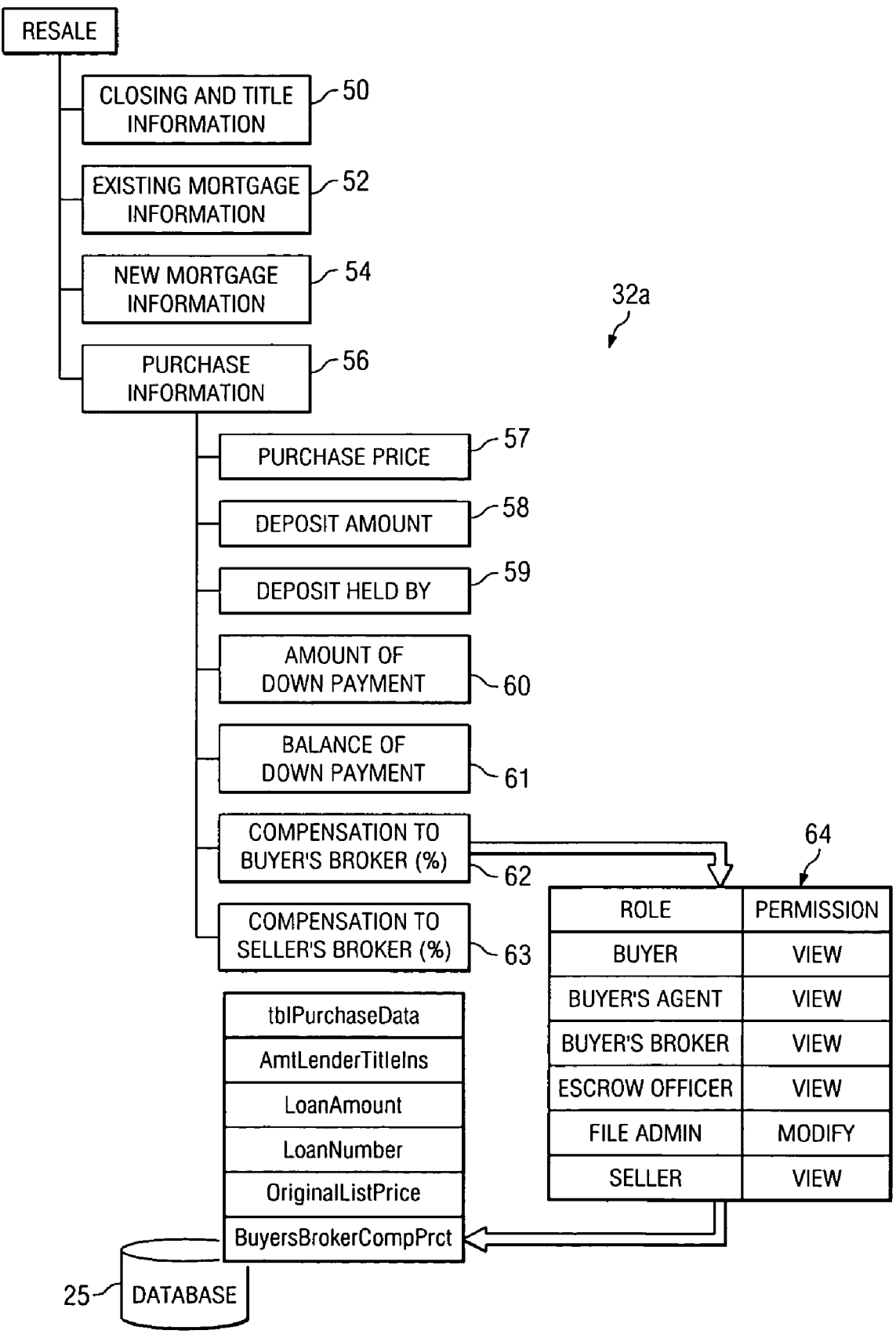
FIG. 3A is an exemplary data structure for a data form template that itself is a sub-template of another template.

As noted above, permissions may be assigned field-by-field for a given template. FIG. 3A is an exemplary data structure for a data form template 32a that itself is a sub-template of another template. The illustrated data form template 32a is a resale data form template. The resale data form template 32a may include, for example, information pertaining to "Resale" of a property. Other data form templates may relate to other information about a transaction. Closing and title information may be entered in an appropriate field 50 in the template 32a. Similarly, existing mortgage information, new mortgage information, and purchase information may be entered in other appropriate fields 52, 54, 56 in the template 32a. Purchase information may include such information as purchase price, deposit amount, deposit held, amount of down payment, balance of down payment, compensation to buyer's broker, and compensation to seller's broker. This information may be entered in appropriate data fields 57-63.

For any particular field, permissions may be established to control which users are able to view which data. For example, in FIG. 3A, the permissions table 64 for the compensation to buyer's broker field 62 is illustrated. The permissions table 64 may include participants identified in accordance with their role in the transaction, such as buyer, buyer's agent, buyer's broker, escrow officer, file administrator, and seller. Each participant may be allowed to "view" the particular data (a "view" flag may be set for a particular role, enabling participants assigned to that role to see the data for that field in the template), or "modify" the data (a "modify" flag may be set for a particular role, enabling participants assigned to that role to edit the data for that field). If no permission is set for a particular role, participants assigned to that role cannot see the data for that field in the template.

Figures 3B, 4:
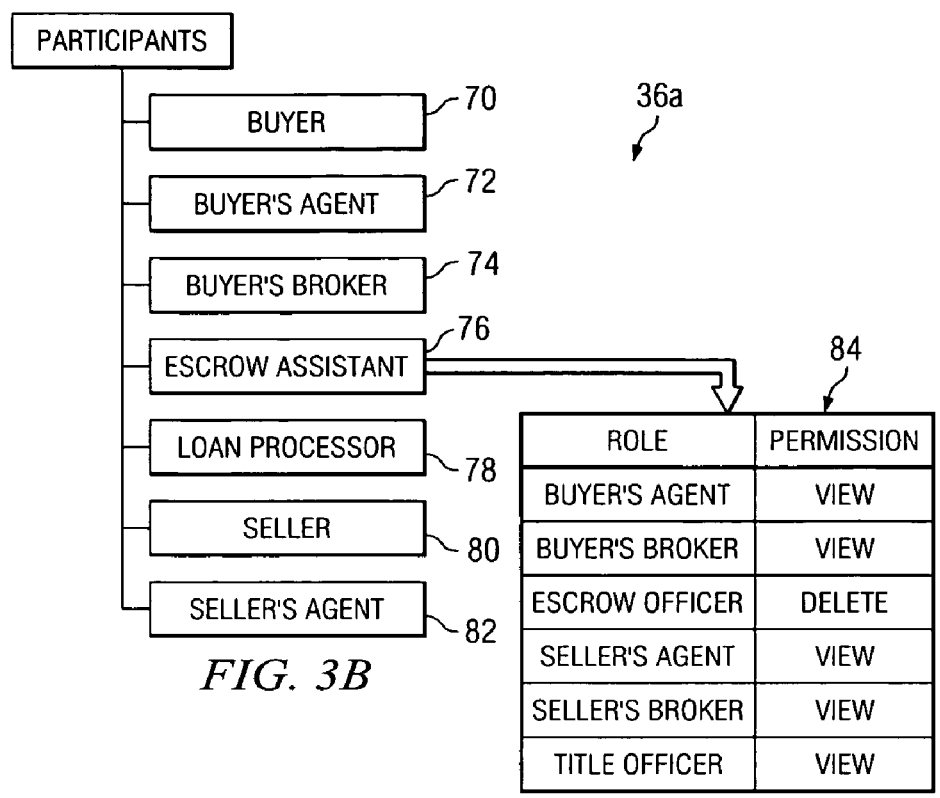
FIG. 3B is an exemplary data structure for a participants rules template, again showing the permission assigning feature of the invention.
FIG. 4 is a diagram illustrating an exemplary structure for a template in accordance with the invention.

FIG. 3B is an exemplary data structure for a participants rules template 36a, again showing the permission assigning feature of the invention. The participants rules template 36a may include fields pertaining to "Participants" to a transaction. Buyer information may be entered in an appropriate field 70 in the template 36a. Similarly, buyer's agent information, buyer's broker information, and escrow assistant information may be entered in other appropriate fields 72, 74, 76 in the template 36a. Loan processor information, seller information, and seller's agent information may also be entered in appropriate fields 78, 80, 82 in the template 36a.

For any particular field, permissions may be established controlling which users are able to view and/or modify which data. For example, in FIG. 3B, the permissions table 84 for the escrow assistant field 76 is illustrated. The permissions table 84 may include participants identified in accordance with their role in the transaction, such as buyer's agent, buyer's broker, escrow officer, seller's agent, seller's broker, and title officer. Each participant may be allowed to "view" the particular data (a "view" flag may be set for a particular role, enabling participants assigned to that role to see the data for that field in the template), "modify" the data (a "modify" flag may be set for a particular role, enabling participants assigned to that role to edit the data for that field), or "delete" the data (a "delete" flag may be set for a particular role, enabling participants assigned to that role to delete data from the transaction). If no permission is set for a particular role, participants assigned to that role cannot see the data for that field in the template.

FIG. 4 is a diagram illustrating an exemplary structure for a template in accordance with the invention. As discussed above, templates contain data fields and, optionally, other templates and their respective information. This allows templates to be nested inside other templates. In FIG. 4, a template 102 indicating residential information is depicted. Various fields may be included in the template 102, such as a number of bedrooms data field 90, a number of bathrooms data field 92, a lot size data field 94, and a square footage data field 96. The information contained in these fields broadly describes particular aspects of a residential property. Other templates may be nested inside the residential template. For example, an existing loan sub-template 98 may indicate information about existing loans taken out on the residential property, and a tax information sub-template 100 may indicate information about tax information pertaining to the residential property.

Generally, for a given file, there is one instance of a particular data field. Multiple templates can, however, reference the same data field. When multiple templates are used to create a file, however, the file is populated only once with common data fields of the multiple templates. Reference is made to FIG. 5 to better illustrate this concept. Consider that a file presently exists containing information about a particular transaction, and it is desired to order services for the transaction. Since the file already exists, the "Deal Terms" and "Property" templates may have been used to create the file. Thus, there is already a set of data fields defined for the file. Based on the services selected, an appropriate order form template may be associated with the file which may contain its own data fields, some of which may be common to those already existing in the file. In such case, those data field(s) from the order form template (or other later added templates) are ignored, and the file is appended with the additional new data fields.

Once a template has been used to set up data fields for a file, users can make changes to the file by adding fields, changing the security (permissions) specified on the fields, etc. Also, a user may want to refresh the file based on the contents of the template which may have changed. Accordingly, a persistent link is maintained between the template and the file created from it. Such linking is well know.

Accordingly, the invention enables participants of a transaction to share information related to a transaction among the participants of a transaction according to their role in the transaction. The invention also enables users to post documents in electronic format that can be reviewed online over a computer network. The invention also may include the ability to receive data from a user, and perpetuate the information on multiple order forms at once. This greatly streamlines the process and reduces the risk of errors. The invention also allows for the ordering of services typically associated with a real estate transaction in an automated fashion, allows the sharing of data among participants, and allows for the electronic posting of documents for individual review and approval.

The invention is directed to an apparatus for receiving and processing data related to performing a real estate transaction. The invention may include a dedicated processor configured to communicate with computers that communicate among one or more networks to receive and transmit data packets related to performing a real estate transaction. However, it will be appreciated by those skilled in the art, that this is illustrative of only one utility of the invention, and that the invention has greater applicability and utility in many other applications where efficient routines and processing of data for performing online transactions within one or more networks is involved. Equivalent structures embodying the invention could be configured for such applications without diverting from the spirit and scope of the invention. Although this embodiment is described and illustrated in the context of premises monitoring devices and systems, the invention extends to other applications where similar features are useful. Furthermore, while the foregoing description has been with reference to particular embodiments of the invention, it will be appreciated that these are only illustrative of the invention and that changes may be made to those embodiments without departing from the principles of the invention, the scope of which is defined by this overall description or any subparts herein.

What is claimed is:

1. A computer-assisted real estate transaction system comprising:

a server, a plurality of client computer systems coupled to the server, a plurality of participants using the clients, the participants each having one of a plurality of predetermined roles in a real estate transaction;

a real estate transaction software application stored on the server and operable to selectively display real estate transaction data to and receive real estate transaction data from the participants;

at least one real estate transaction database coupled to the server and coupled to the real estate transaction software application for storing real estate transaction data; and the real estate transaction software application being logically segmented into a plurality of cobrand sites with each of the plurality of cobrand sites having at least one set of real estate transaction templates for managing information about particular real estate transactions and controlling the business rules and functionality of the last said real estate transactions, the at least one set of real estate transaction templates including all three of transaction types templates, data forms templates, and transaction data templates, the transaction types templates each being provided for a respective type of real estate transaction and determining which of the data forms templates are available for the associated type of real estate transaction, the data forms templates each defining core transaction data pertaining to a particular transaction and specifying field-level access rights by the participants to the data in accordance with a participant's role in the transaction.

2. The system of claim 1, wherein the data forms templates comprise one or more grouped data fields pertaining to a particular aspect of the transaction.

3. The system of claim 1, wherein each template includes one or more data fields pertaining to parametric data about an aspect of the transaction and wherein each field is associated with a permissions parameter controlling a particular participant's ability to interact with the data maintained in the field.

4. The system of claim 3, wherein the permissions parameter controls a participant's ability to view, modify, or delete the data maintained in the field.

5. The system of claim 1, wherein the templates are nested within other templates.

6. The system of claim 1, wherein the real estate transaction templates further include documents templates which determine which documents are needed for a particular type of real estate transaction and what access various participants to the transaction have to those documents templates.

7. The system of claim 1, wherein the real estate transaction templates further include "to do list" templates used by participants and including "to do" items which need to be performed in the real estate transaction.

8. The system of claim 1, wherein the server is coupled to the client computer systems through the world wide web, the real estate software application being linked to the world wide web through the plurality of cobrand sites.

9. A computer-assisted real estate transaction system comprising:
a server, a plurality of client computer systems coupled to the server, a plurality of participants using the clients, the participants each having one of a plurality of predetermined roles in a real estate transaction;
a real estate transaction software application stored on the server and operable to selectively display real estate transaction data to and receive real estate transaction data from the participants;
at least one real estate transaction database coupled to the server and coupled to the real estate transaction software application for storing real estate transaction data; and
the real estate transaction software application being logically segmented into a plurality of cobrand sites with each of the plurality of cobrand sites having at least one set of real estate transaction templates for managing information about particular real estate transactions and controlling the business rules and functionality of the last said real estate transactions, the at least one set of real estate transaction templates including transaction types templates, data forms templates, transaction data templates and participants rules templates, the transaction types templates each being provided for a respective type of real estate transaction and determining which of the data forms templates are available for the associated type of real estate transaction, the data forms templates each defining core transaction data pertaining to a particular transaction and specifying field-level access rights by the participants to the data in accordance with a participant's role in the transaction and the participants rules templates identifying types of participants which can be parties to a real estate transaction.

10. A computer-assisted real estate transaction system comprising:
a server, a plurality of client computer systems coupled to the server, a plurality of participants using the clients, the participants each having one of a plurality of predetermined roles in a real estate transaction;
a real estate transaction software application stored on the server and operable to selectively display real estate transaction data to and receive real estate transaction data from the participants;
at least one real estate transaction database coupled to the server and coupled to the real estate transaction software application for storing real estate transaction data; and
the real estate transaction software application being logically segmented into a plurality of cobrand sites with each of the plurality of cobrand sites having at least one set of real estate transaction templates for managing information about particular real estate transactions and controlling the business rules and functionality of the last said real estate transactions, the at least one set of real estate transaction templates including transaction types templates, data forms templates, transaction data templates and services rules templates, the transaction types templates each being provided for a respective type of real estate transaction and determining which of the data forms templates are available for the associated type of real estate transaction, the data forms templates each defining core transaction data pertaining to a particular transaction and specifying field-level access rights by the participants to the data in accordance with a participant's role in the transaction and the services rules templates determining which type of participant can order which of a predetermined number of services used in the course of completing a real estate transaction.

* * * * *

UNITED STATES PATENT AND TRADEMARK OFFICE
CERTIFICATE OF CORRECTION

PATENT NO. : 7,343,348 B2  Page 1 of 1
APPLICATION NO. : 09/861282
DATED : March 11, 2008
INVENTOR(S) : McAvoy et al.

It is certified that error appears in the above-identified patent and that said Letters Patent is hereby corrected as shown below:

On the Title page

After Item (65), please insert the following Item (60):

--Related U.S. Application Data
(60) Provisional application No. 60/206,086, filed on May 19, 2000--.

Signed and Sealed this
Seventeenth Day of May, 2011

David J. Kappos
*Director of the United States Patent and Trademark Office*

(12) EX PARTE REEXAMINATION CERTIFICATE (9709th)
United States Patent
McAvoy et al.

(10) Number: US 7,343,348 C1
(45) Certificate Issued: Jun. 17, 2013

(54) SYSTEM FOR PERFORMING REAL-ESTATE TRANSACTIONS OVER A COMPUTER NETWORK USING PARTICIPANT TEMPLATES

(75) Inventors: Charles McAvoy, Granite Bay, CA (US); Erik Novikoff, Sacramento, CA (US); Kelly S. Pantis, Carmichael, CA (US); Elizabeth Hitchcock, Sacramento, CA (US)

(73) Assignee: Bank of America, N.A., Charlotte, NC (US)

Reexamination Request:
No. 90/012,642, Sep. 14, 2012

Reexamination Certificate for:
Patent No.: 7,343,348
Issued: Mar. 11, 2008
Appl. No.: 09/861,282
Filed: May 18, 2001

Certificate of Correction issued May 17, 2011

(51) Int. Cl.
*H04K 1/00* (2006.01)
*H04L 9/00* (2006.01)

(52) U.S. Cl.
USPC .............. 705/54; 705/26.1; 705/313; 705/35; 705/51; 707/999.01; 709/224

(58) Field of Classification Search
None
See application file for complete search history.

(56) References Cited

To view the complete listing of prior art documents cited during the proceeding for Reexamination Control Number 90/012,642, please refer to the USPTO's public Patent Application Information Retrieval (PAIR) system under the Display References tab.

*Primary Examiner* — Samuel Rimell

(57) ABSTRACT

A system for facilitating electronic transactions among participants to a transaction is afforded that comprises a server having a software application stored thereon, one or more databases associated with the server for storing transactional data and documents relating to the transactions, and one or ignore client computer systems connected with the server for remotely accessing the transactional data and documents pertaining to the transactions and for performing particular tasks relating to the transactions. The software application is logically segmented into particular sites for controlling the functionality of the electronic transactions, and each site has a set of associated templates for managing information about the transactions. The templates control the business rules and functionality of the transactions. Preferably, the templates are grouped according to particular categories, such as transaction types, data forms, transaction data, participants rules, services rules, and documents. Each template includes one or more data fields pertaining to parametric data about an aspect of the transaction and wherein each field is associated with a permissions parameter indicating a particular participant's ability to interact with the data maintained in the field. The permissions parameter indicates a participant's ability to view, modify, or delete the data maintained in the field.

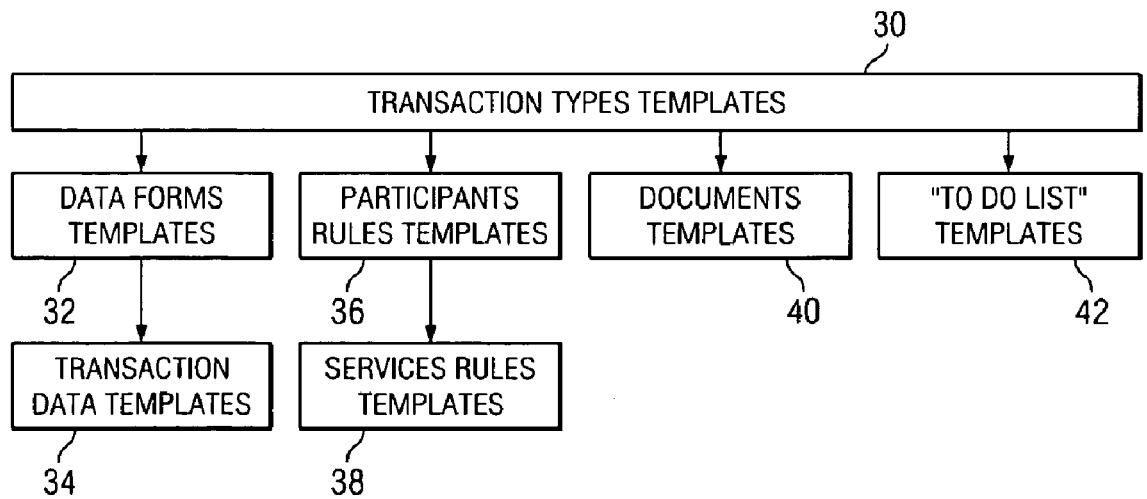

EX PARTE
REEXAMINATION CERTIFICATE
ISSUED UNDER 35 U.S.C. 307

NO AMENDMENTS HAVE BEEN MADE TO
THE PATENT

AS A RESULT OF REEXAMINATION, IT HAS BEEN DETERMINED THAT:

The patentability of claims 1-10 is confirmed.

\* \* \* \* \*